United States Patent [19]

Menchetti

[11] Patent Number: 5,383,317
[45] Date of Patent: Jan. 24, 1995

[54] SHAFT WALL CAVITY EXTENSION
[75] Inventor: Robert J. Menchetti, Buffalo, N.Y.
[73] Assignee: National Gypsum Company, Charlotte, N.C.
[21] Appl. No.: 14,594
[22] Filed: Feb. 8, 1993
[51] Int. Cl.[6] .......................................... E04F 17/08
[52] U.S. Cl. ................................. 52/220.2; 52/509
[58] Field of Search ............... 52/220.1, 220.2, 282.1, 52/506, 509

[56] References Cited

U.S. PATENT DOCUMENTS

| 858,797 | 10/1907 | Menchetti. | |
|---|---|---|---|
| 2,064,683 | 12/1936 | Olsen | 52/220.1 X |
| 3,339,324 | 9/1967 | Stackhouse | 52/241 |
| 4,016,690 | 4/1977 | Richardson | 52/238 |
| 4,050,205 | 9/1977 | Ligda | 52/220.1 X |
| 4,364,212 | 12/1982 | Pearson et al. | 52/281 |
| 4,800,696 | 1/1989 | Miller | 52/220.1 X |
| 4,841,710 | 6/1989 | Considine | 52/220.1 X |
| 4,860,503 | 8/1989 | Palmer | 52/220.1 X |
| 4,898,357 | 2/1990 | Jorgensen | 52/220.1 X |

OTHER PUBLICATIONS

Title: Indicator and Control Box Protection, Section A-A, p. 11.
Title: Construction Details, p. 8.
Ser. No. 858,797, filed Mar. 3, 1992, Menchetti.

Primary Examiner—Carl D. Friedman
Assistant Examiner—Beth A. Aubrey
Attorney, Agent, or Firm—Marshall, O'Toole, Gerstein, Murray & Borun

[57] ABSTRACT

A hollow shaft wall having a cavity of a first width substantially throughout said wall and a cavity of a greater width in a limited section for the reception of a relatively deep utility box, the limited section having board omitted on one side thereof, and a short section of board affixed over the omitted section, creating the cavity of a greater width. The short section of board is affixed to boards or studs of the wall by short elongate clips having a pair of channels opening in opposite directions.

20 Claims, 3 Drawing Sheets

SHAFT WALL CAVITY EXTENSION

This invention relates to hollow or cavity shaft walls constructed of metal studs and gypsum boards, and more particularly to increasing the cavity depth at utility boxes, particularly in horizontal stud walls.

BACKGROUND OF THE INVENTION

Hollow, gypsum board walls surrounding elevator shafts have heretofore been constructed generally with vertical studs, typically as shown in Pearson, et al. U.S. Pat. No. 4,364,212. Suppliers of the metal I-stud for the Pearson, et al. wall found it necessary to provide I-studs of varying flange-to-flange dimensions, larger studs being essential when walls were to be taller than about ten feet.

The smallest and most common I-stud was 2½ inches, flange-to-flange, whereby the depth of utility boxes used therewith could be no greater than 2½ inches. If deeper boxes were ever needed, a larger stud would be used for that particular wall, normally the corridor-side wall.

A new and improved wall has been developed wherein horizontal studs are employed, one big advantage being that the horizontal studs can be 2½ inches, flange-to-flange, regardless of the height of the wall. Accordingly, only 2½ inch studs are manufactured for these walls. As a result, larger studs are not available for those occasions when a utility box deeper than 2½ inches is needed.

SUMMARY OF THE INVENTION

A hollow, gypsum board wall is provided by the present invention which includes limited sections of increased depth of the wall cavity, the limited sections being only where it is desired to place a utility box, such as for elevator call buttons, elevator floor indicating lights, fireman switches, etc.

This additional depth is provided by omitting a short, full-width section of 1-inch-thick shaftliner or core board and installing preferably two layers of shaftliner or core board on the shaft side, overlapping this open area, creating 1-inch additional wall cavity.

It is an object of the present invention to provide a hollow wall structure wherein relatively deeper utility boxes can be installed.

It is a further object of the invention to provide a horizontal stud wall system wherein only one minimum size stud can be employed while still permitting modification of limited sections to permit installation of relatively deeper utility boxes.

These and other objects and advantages will be clearly understood in considering the preferred embodiments as set forth in the specification and shown in the drawings in which.

DESCRIPTION OF THE PREFERRED EMBODIMENTS

Figure 1:
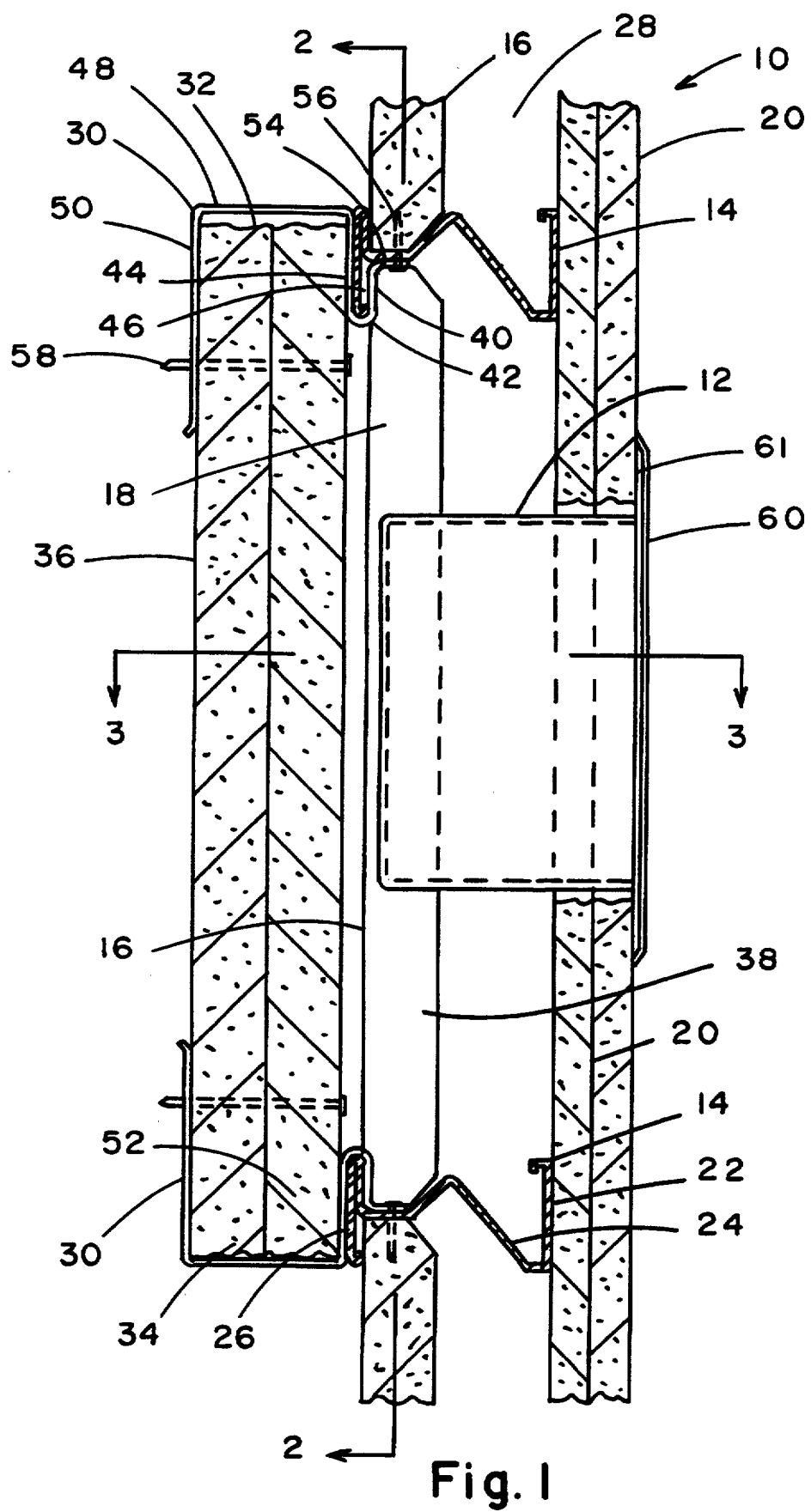
FIG. 1 is a vertical sectional end view of a hollow, horizontal stud shaft wall, having an expanded depth section with a 3½-inch-deep utility box installed onto the corridor side of the wall.
Figure 2:
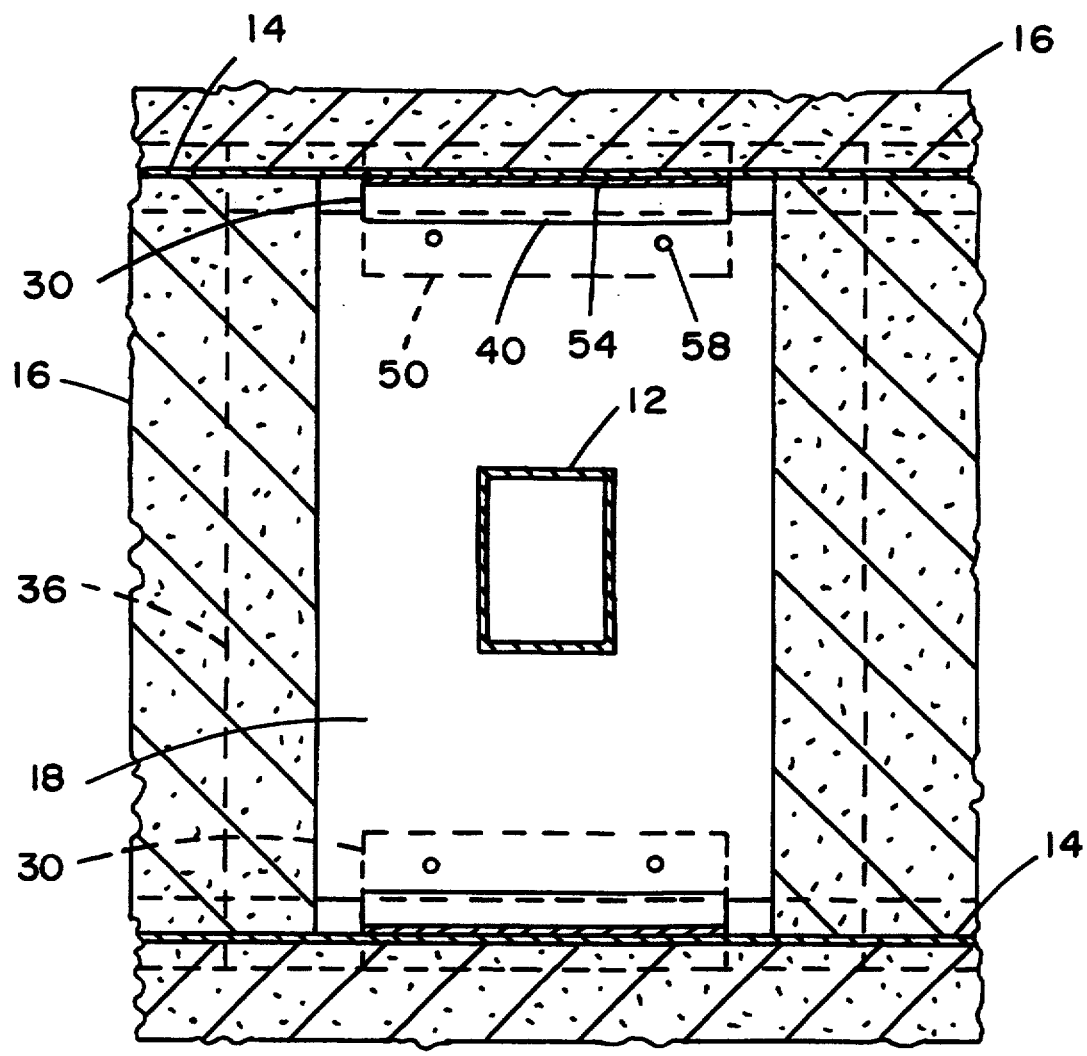
FIG. 2 is a vertical sectional face view of the wall of FIG. 1, taken along line 2—2.
Figure 3:
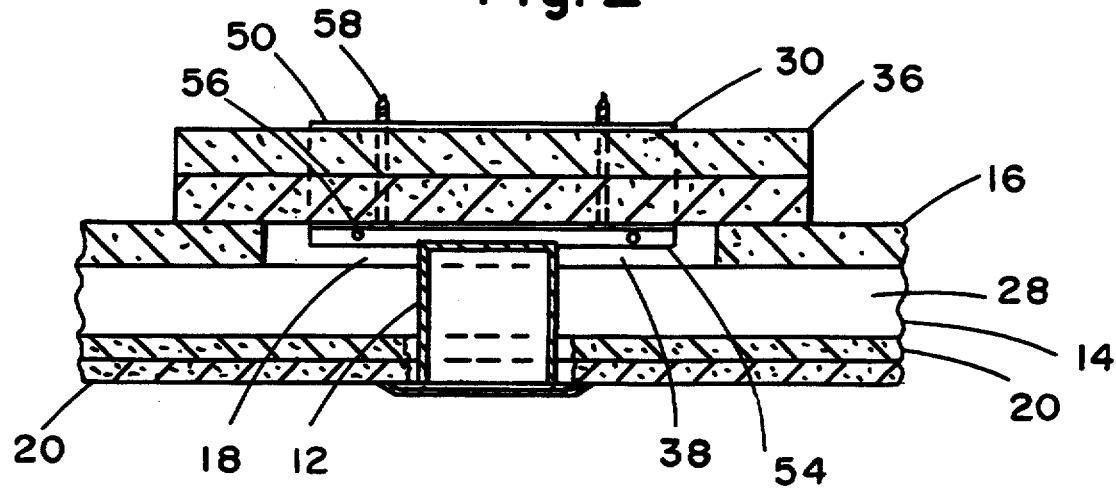
FIG. 3 is a horizontal sectional top view of the wall of FIG. 1, taken along line 3—3.

Referring to FIGS. 1–3, there is shown a small section of a hollow wall 10 whereat a relatively deep utility box 12 is installed in the wall 10. The wall 10, other than at this limited section, is constructed in accordance with the description set forth in copending application Ser. No. 07/858,797, filed Mar. 27, 1992, which application is incorporated herein by reference.

Wall 10 is basically constructed of alternating horizontal studs 14 and horizontally extending, 1-inch-thick, 2-foot-wide, gypsum primary core boards 16. As seen in FIGS. 2 and 3, a short, full-width section of core board 16 is omitted in a limited section 18 of wall 10.

Two layers of ½-inch-thick, 4-foot-wide wallboard 20 is screw attached to the outer flanges 22 of horizontal studs 14. The web 24 of each stud 14 is supported on a core board 16 disposed immediately therebelow, and another core board 16, disposed immediately thereabove, is supported on the web 24. The core boards 16 are disposed against the inner flanges 26 of the studs 14, and are thus spaced inwardly from the outer flanges 22 and the wallboards 20, forming the hollow, or the cavity 28 of wall 10.

In accordance with the invention, a pair of short, elongate clips 30 is affixed to the inner flanges 26 of the two studs 14 which form the top and the bottom of the limited section 18. Clips 30 hold, respectively, the top edge 32 and the bottom edge 34 of a pair of core board short sections 36 which overlap the open limited section 18, forming a hollow cavity 38, at the limited section 18, which is 1-inch wider than the cavity 28 in the other areas of wall 10.

The short, elongate clips 30 each include a narrow outer wall 40 connected by a reverse bend 42 to a somewhat wider middle wall 44, which form a channel 46 which is affixed over an inner flange 26 of a stud 14. Extending inwardly from the middle wall 44 is a horizontal wall 48, and then extending perpendicularly to horizontal wall 48, is an innermost, wide wall 50, forming a channel 52 which holds a top edge 32 or a bottom edge 34 of the pair of core board sections 36. Horizontal wall 48 and wide wall 50 can be made as long as the core board sections 36 held therein. Clips 30 may also include a narrow leg 54 extending outwardly from outer wall 40, for screw attachment of clip 30 to stud web 24, by screws 56. The core board sections 36 are preferably screw attached to innermost walls 50 by screws 58.

Utility box 12 includes a face plate 60 which is affixed against the outer face 61 of wallboards 20. Utility box 12 may contain any device, such as elevator call buttons, elevator floor indicating lights, fireman switches, etc.

Figure 4:
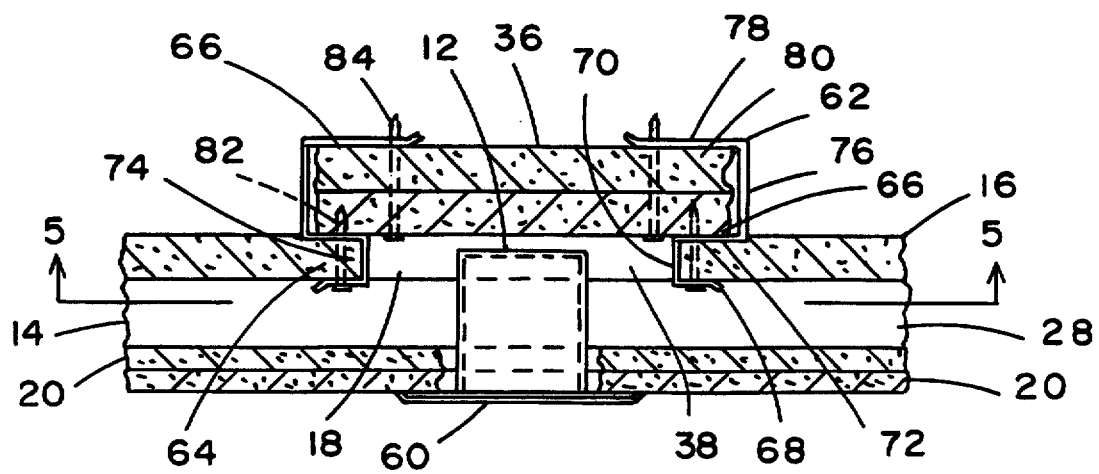
FIG. 4 is a horizontal sectional top view of a modified form of expanded depth section of a hollow, horizontal stud shaft wall.
Figure 5:
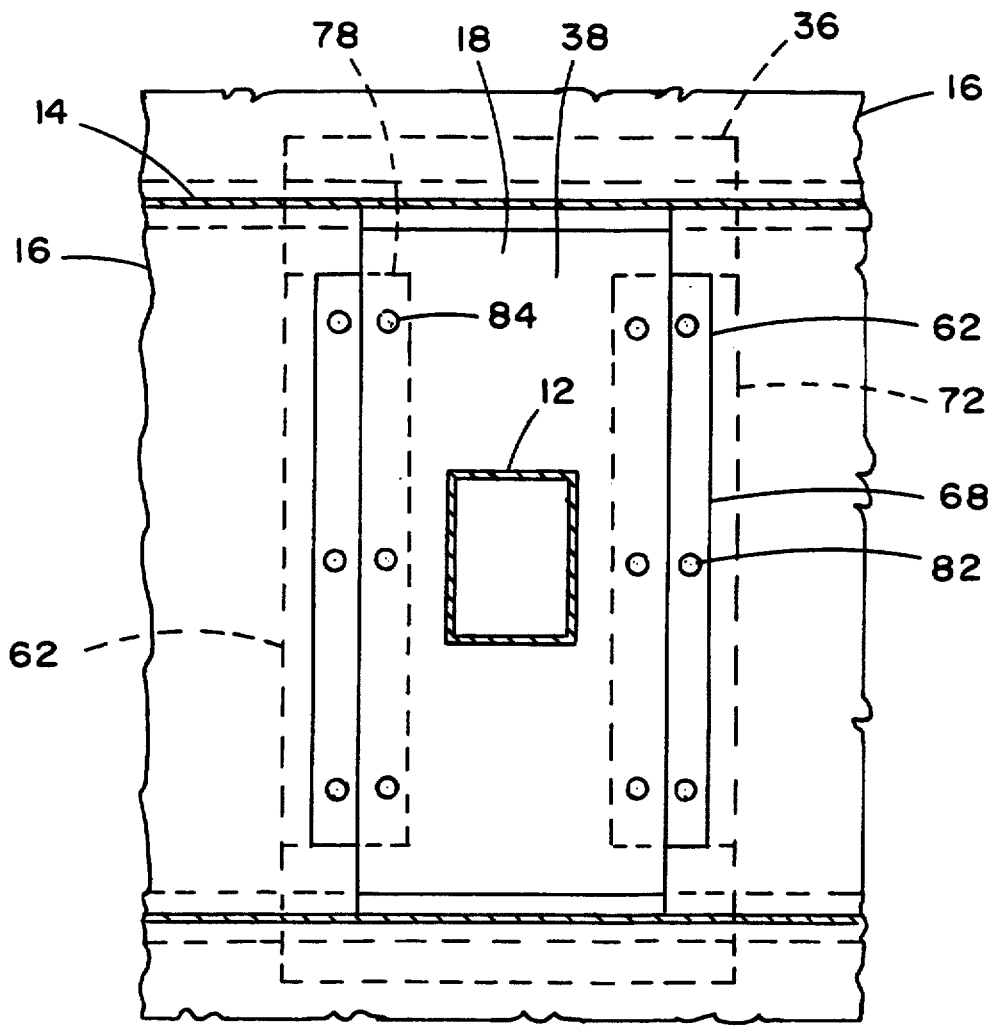
FIG. 5 is a vertical sectional face view of the wall of FIG. 4, taken on line 5—5.

Referring to FIGS. 4 and 5, another embodiment of the invention is shown, wherein similar elements are identified by numerals similar to those used in FIGS. 1–3. In this embodiment, the pair of core board sections 36 are held in an overlapping relation over the open limited section 18 by short, elongate clips 62, which are affixed to the ends 64 of the primary core boards 16 which form the sides of the limited section 18. Clips 62 hold the side edges 66 of the pair of core board sections 36 which overlap the open limited section 18, forming a hollow cavity 38, at the limited section 18, which is 1-inch wider than the cavity 28 in the other areas of wall 10.

The short, elongate clips 62 each include a narrow outer wall 68 connected by a narrow base wall 70 to a somewhat wider middle wall 72 which form a channel 74 which is affixed over an end 64 of a primary core board 16. Extending inwardly from the middle wall 72 is a wide base wall 76 and then extending perpendicularly from wide base wall 76 is an innermost wide wall 78 forming a channel 80 which holds a side edge 66 of the pair of core board sections 36. Base wall 76 and wide wall 78 can be as long as the core board sections 36 held therein.

The clips 62 are preferably screw attached to core board ends 64 by screws 82 which are each screwed through an outer wall 68, a core board end 64 and a middle wall 72. The pair of core board sections 36 are screw attached to clips 62 by screws 84 which are each screwed through a side edge 66 and an innermost wide wall 78.

Having completed a detailed disclosure of the preferred embodiments of my invention, so that others may practice the same, I contemplate that variations may be made without departing from the essence of the invention.

I claim:

1. The method of making a hollow wall with multiple cavity widths comprising the steps of erecting a wall having an outer side and an inner side and a plurality of elongate metal horizontal studs, wallboards affixed to said metal studs on said outer side of said wall, and primary core boards mounted against said studs in spaced parallel relation to said wallboards, forming a primary cavity between said core boards and said wallboards having a width equal to a first dimension, omitting a portion of said core board, affixing a section of core board on said inner side of said wall over said omitted portion, said section overlying and covering said section, whereby a section cavity is formed between said wallboard and said section, said section cavity being wider than said primary cavity.

2. The method of claim 1, wherein said elongate metal studs are erected extending horizontally.

3. The method of claim 2, wherein said section of core board is affixed to a pair of adjacent horizontal studs.

4. The method of claim 3, wherein said studs have inner flanges, and metal clips having a pair of oppositely directed channels are mounted respectively over said stud inner flanges and over a portion of said section of core board.

5. The method of claim 3, wherein metal clips, having a pair of oppositely directed channels, are fastened to said primary core boards and to said section of said core board.

6. The method of claim 5, further comprising connecting said clips to said core boards and said sections with screws.

7. The method of claim 1, wherein a second section of core board is combined with said first mentioned section.

8. The method of claim 1, wherein an opening is formed in said wallboards and a relatively deep utility box is mounted within said opening and said section cavity.

9. The method of claim 8, wherein said wall is erected adjacent an elevator shaft, said metal studs extend horizontally and are spaced vertically apart by said primary core boards, said studs comprise inner flanges and outer flanges spaced apart horizontally by a web and said erecting of said wall includes placing said primary core boards against an outer side of said inner flanges prior to an affixation of said wallboards to said studs and affixing said section of core board prior to said affixation of said wallboard, said affixing of said section of core board including placing metal clips having oppositely directed channels on said section of core board and also on elements of said wall studs and core boards.

10. The method of claim 8, wherein said utility box contains utilities of the group consisting of elevator call buttons, elevator indicating lights and fireman switches.

11. A hollow wall having an inner side and an outer side and comprising a plurality of elongate metal studs and spaced parallel boards mounted on said studs, said spaced parallel boards forming a primary cavity therebetween having a width equal to a first dimension, a section of one of said boards being omitted on said inner side of said wall, a piece of board affixed on said inner side of said wall completely overlapping said omitted section, thereby forming between said piece of board and said boards on said outer side of said wall an extended cavity having a width greater than said width of said primary cavity.

12. A hollow wall as defined in claim 11, wherein said elongate studs extend horizontally.

13. A hollow wall as defined in claim 12, wherein said boards on said inner side of said wall are core boards and said studs are comprised of inner flanges, outer flanges and a web connecting said inner and outer flanges, said core boards having elongate side edges abutting said stud webs.

14. A hollow wall as defined in claim 13, wherein said core boards are held against an outer surface of said inner flanges.

15. A hollow wall as defined in claim 13, wherein said piece of board is affixed against said inner side of said wall by clips each having a pair of oppositely directed channels.

16. A hollow wall as defined in claim 15, wherein one of said channels of said clips engages an edge of said piece of board.

17. A hollow wall as defined in claim 16, wherein one of said channels of said clips engages an inner flange of one of said horizontal studs.

18. A hollow wall as defined in claim 16, wherein each clip has a second channel engaging an end of a core board.

19. A hollow wall as defined in claim 11, wherein a second piece of board is affixed against said first mentioned piece of board.

20. A hollow wall as defined in claim 11, and further including a relatively deep utility box mounted within said extended cavity.

* * * * *